US008658276B2

(12) United States Patent
Han et al.

(10) Patent No.: US 8,658,276 B2
(45) Date of Patent: Feb. 25, 2014

(54) ECO-FRIENDLY INCOMBUSTIBLE BIOCOMPOSITE AND METHOD FOR PREPARING THE SAME

(75) Inventors: Seong Ok Han, Daejeon (KR); Youn Jong You, Daejeon (KR); Nam Jo Jeong, Daejeon (KR); Hee Yeon Kim, Daejeon (KR)

(73) Assignee: Korea Institute of Energy Research (KR)

( * ) Notice: Subject to any disclaimer, the term of this patent is extended or adjusted under 35 U.S.C. 154(b) by 476 days.

(21) Appl. No.: 12/958,728

(22) Filed: Dec. 2, 2010

(65) Prior Publication Data

US 2011/0212293 A1    Sep. 1, 2011

(30) Foreign Application Priority Data

Feb. 26, 2010  (KR) .................. 10-2010-0018250
Feb. 26, 2010  (KR) .................. 10-2010-0018251

(51) Int. Cl.
| B32B 9/02 | (2006.01) |
| B32B 17/06 | (2006.01) |
| B32B 27/06 | (2006.01) |
| B32B 33/00 | (2006.01) |
| B32B 37/06 | (2006.01) |
| B32B 37/26 | (2006.01) |

(52) U.S. Cl.
USPC ....... 428/300.7; 428/34.7; 428/116; 428/325; 428/327; 52/309.14

(58) Field of Classification Search
USPC ......... 428/116, 323, 326, 451, 446, 327, 220, 428/174, 178, 182, 191, 412, 448, 449, 332, 428/373, 293.4, 297.4, 300.7, 221, 292.1, 428/34.4–34.7; 524/9; 442/149, 262; 52/309.8–309.11, 309.13–309.15, 451, 52/847

See application file for complete search history.

(56) References Cited

U.S. PATENT DOCUMENTS 3,546,143 A * 12/1970 Corbett ............................ 521/79
RE27,747 E * 9/1973 Johnson ........................ 165/166
(Continued)

FOREIGN PATENT DOCUMENTS

| JP | 62215749 | 9/1987 |
| JP | 2001220839 | 8/2001 |
| JP | 2003236966 A * | 8/2003 |
| JP | 2007307718 A * | 11/2007 |

OTHER PUBLICATIONS

Chapple and Anandjiwala, "Flammability of Natural Fiber-reinforced Composites and Strategies for Fire Retardancy: A Review", Nov. 2010, Journal of Thermoplastic Composite Materials, vol. 23, pp. 871-888.*

(Continued)

*Primary Examiner* — David Sample
*Assistant Examiner* — Nicholas W Jordan
(74) *Attorney, Agent, or Firm* — Cantor Colburn LLP

(57) ABSTRACT

Disclosed is an eco-friendly incombustible biocomposite including: a) a polymer matrix comprising a natural fiber; and b) a ceramic sheet laminated integrally with the polymer matrix. The biocomposite is eco-friendly since the natural fiber is used as a reinforcement material and is incombustible since it is laminated integrally with the ceramic sheet. Further, it has superior storage modulus, dimensional stability and flexural properties and lightweightness, and is processable into various structures. Thus, it is very useful for automotive or building indoor/outdoor materials.

8 Claims, 13 Drawing Sheets

(a) Plate structure (b) Wave structure (c) Single plate-wave combination structure (d) Double plate-wave combination structure (e) Honeycomb structure

(56) References Cited

U.S. PATENT DOCUMENTS

| | | | |
|---|---|---|---|
| 4,808,460 A * | 2/1989 | Chyung et al. | 428/116 |
| 7,232,605 B2 * | 6/2007 | Burgueno et al. | 52/793.11 |
| 7,431,980 B2 * | 10/2008 | Woodman et al. | 428/297.4 |
| 2006/0275563 A1 * | 12/2006 | Duffy | 428/34.2 |
| 2007/0141318 A1 * | 6/2007 | Balthes | 428/293.4 |
| 2010/0167005 A1 * | 7/2010 | Ketzer et al. | 428/116 |
| 2011/0052881 A1 * | 3/2011 | Netravali et al. | 428/178 |
| 2011/0281066 A1 * | 11/2011 | Andrews et al. | 428/319.3 |

OTHER PUBLICATIONS

Gibson and Mouritz (ed.), "Flame Retardant Composites", Chapter 8 in "Fire Properties of Polymer Composite Materials", 2006, Springer, The Netherlands, pp. 237, 273-279.*

* cited by examiner

Henequen

Kenaf

Silk (a) Plate structure (b) Wave structure (c) Single plate-wave combination structure (d) Double plate-wave combination structure (e) Honeycomb structure (a)　　　　　　(b)　　　　　　(c)

(a) (b) (c)

ECO-FRIENDLY INCOMBUSTIBLE BIOCOMPOSITE AND METHOD FOR PREPARING THE SAME

CROSS-REFERENCE TO RELATED APPLICATIONS

This application claims priority under 35 U.S.C. §119 to Korean Patent Application Nos. 10-2010-0018250 and 10-2010-0018251, filed on Feb. 26, 2010, in the Korean Intellectual Property Office, the disclosure of which is incorporated herein by reference in its entirety.

TECHNICAL FIELD

The present disclosure relates to a biocomposite and a method for preparing the same, more specifically to a biocomposite having superior eco-friendliness, storage modulus and dimensional stability as well as heat resistance and flame retardancy, and a method for preparing the same.

BACKGROUND

Most polymer composites commonly used in automotive or construction industries employ glass fiber as reinforcement material. However, they cause many problems in terms of energy and environment, because the glass fiber is harmful to the human body and unsuited to recycling. Recently, biocomposites using natural fiber as reinforcement material are studied in order to reduce the use of harmful glass fiber.

Being lighter than glass fiber-reinforced polymer composites by 30% or more, biocomposites are cutting-edge new material that can lead to energy saving through improved fuel efficiency (1.6%) when used for automotive parts. Further, since the natural fiber is lighter and wears machinery less as compared to the glass fiber, it can reduce energy consumption by 80% during the production. Also, the cost of the natural fiber (about 5 won/g) is only about ¼ that of the glass fiber (20 won/g). In addition, the natural fiber is lighter (density: 1.3 g/cm$^3$) than the glass fiber (density: 2.6 g/cm$^3$), while having superior toughness and specific modulus.

Until recently, biocomposites including powder or fiber derived from wood or non-wood natural fibers were mainly reported as cellulose-based reinforcement materials. However, the cellulose-based reinforcement materials have varying properties depending on the particular tree, the growth condition of the natural fiber, the particular portion in the tree, the growth period, or the like. Even a single fiber tends to have different composition and size in different portions. Thus, when the fiber is used as the reinforcement material without any processing, the resulting biocomposite has different properties in different parts. Further, there are concerns about the damage to the forests related with the use of the wood-derived reinforcement materials and the cultivation of non-woody plants such as flax or hemp, which are commonly used as reinforcement material in biocomposites recently.

Accordingly, studies are carried out actively over the world in order to utilize eco-friendly biomaterials as high-functional materials.

SUMMARY

The present disclosure is directed to providing a biocomposite having superior eco-friendliness, storage modulus and dimensional stability as well as enhanced heat resistance and flame retardancy.

The present disclosure is also directed to providing a method for preparing the eco-friendly incombustible biocomposite.

In one general aspect, the present disclosure provides an eco-friendly incombustible biocomposite including: a) a polymer matrix comprising a natural fiber; and b) a ceramic sheet laminated integrally with the polymer matrix, wherein the content of the natural fiber is 1 to 70 wt %, the content of the polymer is 1 to 98%, and the content of the ceramic sheet is 1 to 30 wt %.

In an embodiment, the ceramic sheet may be provided on at least one side of the polymer matrix comprising the natural fiber or between two sheets of the polymer matrix.

The natural fiber may be one or more selected from a group consisting of wood pulp, non-wood fiber, microalgae byproduct, seaweed byproduct, silk fiber and henequen fiber, but is not limited thereto.

In case wood pulp or non-wood fiber is used, one having a length of 1 μm to 3 cm may be used, and, in case microalgae byproduct or seaweed byproduct is used, one having a length of 0.1 to 1,000 μm may be used.

The polymer may be one or more selected from a group consisting of a biodegradable polymer such as polylactic acid (PLA), polycaprolactone (PCL), blend of polylactic acid (PLA) with starch and polybutylene succinate (PBS), a general-use polymer such as polypropylene, polyethylene and polycarbonate, and a blend thereof, but is not limited thereto.

The ceramic sheet may include a ceramic fiber including $SiO_2$, $Al_2O_3$, CaO, MgO or a mixture thereof. The content of the ceramic fiber in the ceramic sheet may be 50 wt % or more. The ceramic sheet may include inorganic materials including the ceramic fiber in an amount of 60% or more.

The ceramic sheet may further include one or more additive(s) selected from an organic fiber, an inorganic additive, an organic additive, an inorganic flocculant or an organic flocculant. The thickness of the ceramic sheet may be 0.05 to 5 mm.

The eco-friendly incombustible biocomposite according to the present disclosure may have a thickness of 0.1 mm to 10 cm.

The eco-friendly incombustible biocomposite according to the present disclosure may have various structures, including a plate structure, a wave structure, a plate-wave combination structure, a honeycomb structure, or a multilayer structure thereof.

In another general aspect, the present disclosure provides a method for preparing an eco-friendly incombustible biocomposite, including: 1) dispersing cut natural fiber and polymer powder on a ceramic sheet; 2) heating the ceramic sheet with the natural fiber and the polymer powder dispersed to melt the polymer powder and then performing compression molding by heating; and 3) cooling the compression molded sheet. Although different depending on the polymer used, the melting temperature may be from 100 to 200° C. and the compression force may be from 0.1 to 10 kgf/cm$^2$.

After the step 3), the resulting biocomposite may be heated again to melt the polymer, and, after placing another ceramic sheet thereon, compression molding may be performed by heating to prepare an eco-friendly incombustible biocomposite with the ceramic sheets attached on both sides.

Also, in accordance with the present disclosure, an eco-friendly incombustible biocomposite with the ceramic sheet provided therein may be prepared by: 1) dispersing cut natural fiber and polymer powder on a ceramic sheet laminated integrally a polymer matrix comprising a natural fiber; 2) heating the ceramic sheet with the natural fiber and the polymer powder dispersed to melt the polymer powder and then performing compression molding by heating; and 3) cooling the compression molded sheet.

After the biocomposite with the ceramic sheet attached is prepared, the biocomposite may be heated again and passed through a wave molding roller to prepare an eco-friendly incombustible biocomposite having a wave structure.

Other features and aspects will be apparent from the following detailed description, the drawings, and the claims.

BRIEF DESCRIPTION OF THE DRAWINGS

The above and other objects, features and advantages of the present disclosure will become apparent from the following description of certain exemplary embodiments given in conjunction with the accompanying drawings, in which.

Figure 1:
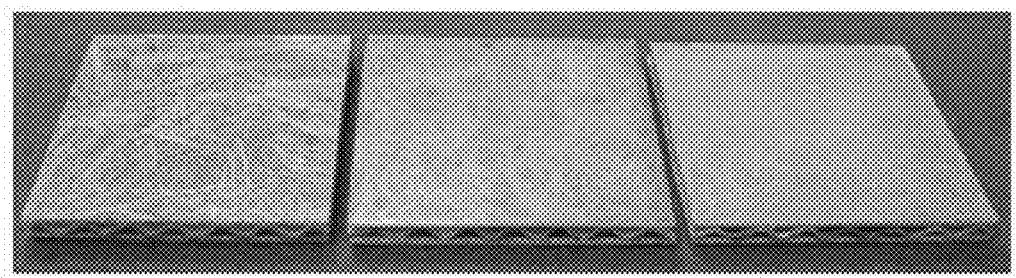
FIG. 1 shows images of biocomposites, using henequen fiber, kenaf fiber and silk fiber from above (The images on the left side show biocomposites without a ceramic sheet, those in the middle show biocomposites having a ceramic sheet on one side, and those in the right side show biocomposites having ceramic sheets on both sides.)
Figure 1:
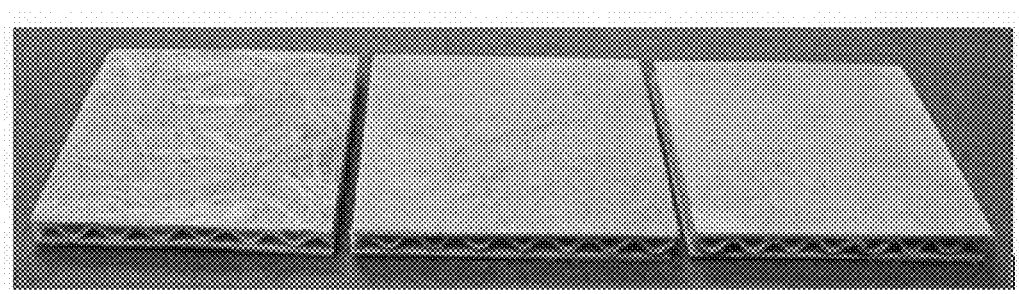
Figure 1:
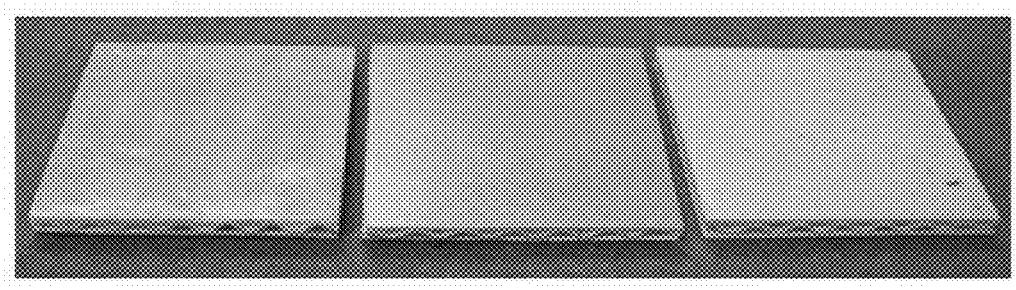

It should be understood that the appended drawings are not necessarily to scale, presenting a somewhat simplified representation of various preferred features illustrative of the basic principles of the disclosure. The specific design features of the disclosure as disclosed herein, including, for example, specific dimensions, orientations, locations and shapes, will be determined in part by the particular intended application and use environment.

In the figures, reference numerals refer to the same or equivalent parts of the disclosure throughout the several figures of the drawings.

DETAILED DESCRIPTION OF EMBODIMENTS

The advantages, features and aspects of the present disclosure will become apparent from the following description of the embodiments with reference to the accompanying drawings, which is set forth hereinafter. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. The terminology used herein is for the purpose of describing particular embodiments only and is not intended to be limiting of the example embodiments. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments will be described in detail with reference to the accompanying drawings.

An eco-friendly incombustible biocomposite according to the present disclosure comprises: a) a polymer matrix comprising a natural fiber; and b) a ceramic sheet laminated integrally with the polymer matrix, wherein the content of the natural fiber is 1 to 70 wt %, the content of the polymer is 1 to 98%, and the content of the ceramic sheet is 1 to 30 wt %.

According to an embodiment of the present disclosure, the ceramic sheet may be provided on at least one side of the polymer matrix comprising the natural fiber or between two sheets of the polymer matrix.

The natural fiber that may be used in the biocomposite according to the present disclosure may be, for example, wood pulp such as softwood pulp or hardwood pulp; non-wood fiber such as straw, bagasse, reed, bamboo, bast fiber, cotton or kenaf fiber; microalgae byproduct; seaweed byproduct such as green algae, brown algae, red algae or freshwater algae; silk fiber; henequen fiber; or the like, but is not limited thereto.

Among them, the microalgae byproduct may be one remaining after lipid extraction from microalgae for producing biodiesel, and the seaweed byproduct may be one prepared by removal of impurities from seaweed followed by solvent extraction and bleaching.

When the wood pulp or non-wood fiber is used as the natural fiber, the length may be from 0.1 mm to 3 cm. If the length of the wood pulp or non-wood fiber is shorter than 0.1 mm, mechanical properties of the biocomposite may be degraded. And, if it exceeds 3 cm, mechanical properties may be degraded or nonuniform because uniform dispersing is difficult.

And, when the microalgae byproduct or seaweed byproduct is used, the length may be from 0.1 to 1,000 μm. If the length of the microalgae byproduct or seaweed byproduct is shorter than 0.1 μm, mechanical properties of the biocomposite may be degraded. And, if it exceeds 1,000 μm, mechanical properties may be degraded or uniform dispersing may be difficult.

The content of the natural fiber in the biocomposite according to the present disclosure may be 1 to 70 wt %. If the content of the natural fiber is less than 1 wt %, the role as the reinforcement material for improving eco-friendliness or mechanical properties of the biocomposite may not be accomplished. And, if it exceeds 70 wt %, interfacial adhesion property may be degraded since the polymer matrix cannot permeate sufficiently between the natural fiber, thereby resulting in degraded mechanical properties of the biocomposite.

The polymer used in the biocomposite of the present disclosure may be any known biodegradable polymer or general-use polymer, without particular limitation. Specifically, the biodegradable polymer may be one that may be degraded by microorganisms, such as polylactic acid (PLA), polycaprolactone (PCL), blend of PCL with starch, polybutylene succinate (PBS), etc., and the general-use polymer may be polypropylene, polyethylene, polycarbonate, etc., but are not limited thereto.

The polymer powder used to prepare the biocomposite of the present disclosure may be in spherical, cylindrical, powder or fiber form. The thickness of the finally prepared biocomposite may be controlled by adjusting the amount of the polymer powder. The biocomposite according to the present disclosure may have a thickness from 0.1 mm to 10 cm. If the thickness of the biocomposite is smaller than 0.1 mm, the natural fiber may not be sufficiently included in the polymer matrix. And, if it exceeds 10 cm, it may be difficult to prepare the biocomposite into a wave or honeycomb structure.

The ceramic sheet, which provides heat resistance and flame retardancy to the biocomposite according to the present disclosure, is a sheet comprising ceramic fiber as main component. The content of the ceramic fiber in the ceramic sheet may be 50 wt % or more, and the content of inorganic materials including the ceramic fiber may be 60 wt % or more. If the content of the ceramic fiber is less than 50 wt % or if the content of the inorganic materials is less than 60 wt %, dimensional stability and heat resistance of the ceramic sheet may be degraded.

Specifically, the ceramic fiber may comprise $SiO_2$, $Al_2O_3$, CaO, MgO or a mixture thereof. The ceramic sheet may further comprise, in addition to the ceramic fiber, an organic fiber, an inorganic additive, an organic additive, an inorganic flocculant or an organic flocculant.

The organic fiber serves to improve moldability during the preparation of the ceramic sheet and to enhance tensile strength of the ceramic sheet. Specific examples may include cellulose (pulp) fiber, silk fiber, polypropylene fiber, etc., but are not limited thereto.

The organic fiber may be added in an amount of 1 to 30 parts by weight based on 100 parts by weight of the ceramic fiber. If the content of the organic fiber is less than 1 part by weight or more than 30 parts by weight based on 100 parts by weight of the ceramic fiber, the characteristics of the ceramic sheet such as moldability and tensile strength may not be fully exerted.

The inorganic additive may be distributed between the ceramic fiber and the organic fiber and serve to improve binding between the fibers. Specific examples of the inorganic additive may include sepiolite, silica, alumina, etc., but are not limited thereto. The inorganic additive may be added in an amount of 15 to 30 parts by weight based on 100 parts by weight of the ceramic fiber. If the content of the inorganic additive is less than 15 parts by weight or more than 30 parts by weight based on 100 parts by weight of the ceramic fiber, binding between the ceramic fiber and the organic fiber may not be enhanced effectively.

The organic additive may serve to improve dissociation and dispersing properties of fiber in a slurry during the preparation of the ceramic sheet, as well as improving moldability and binding between the ceramic fiber and the organic fiber as being distributed between the fibers. Specific examples of the organic additive may include polyethylene glycol, polyethylene oxide, sodium carboxymethyl cellulose, polyvinyl acetate, etc., but are not limited thereto. The organic additive may be added in an amount of 1 to 30 parts by weight based on 100 parts by weight of the ceramic fiber. If the content of the organic additive is less than 1 part by weight or more than 30 parts by weight, moldability of the ceramic sheet and binding between the ceramic fiber and the organic fiber may not be enhanced effectively.

The inorganic flocculant and the organic flocculant may serve to improve promote ionic bonding between the additives included in the slurry for preparing the ceramic sheet or to improve dispersibility of the additives in the slurry. Specific examples of the inorganic flocculant may include aluminum sulfate, aluminum chloride, iron chloride, iron sulfate, polyaluminum chloride, polyaluminum sulfate, etc. and specific examples of the organic flocculant may include cationic starch, poly(diallyldimethylammonium chloride) (PDADMAC), anionic polyacrylamide (A-PAM), etc., but are not limited thereto. They include the substances used to bind the additives included in the slurry and those added to disperse them.

The addition amount of the inorganic flocculant and the organic flocculant may be different depending on the ionic concentration of the particular flocculant used. They may be added in such an amount that the zeta potential of the slurry is between −100 mV and +100 mV. If the zeta potential of the slurry falls outside this range upon addition of the inorganic flocculant or the organic flocculant, flocculation and dispersion in the slurry may not be achieved effectively.

The ceramic sheet used in the present disclosure may be prepared by a) adding the ceramic fiber, the organic fiber, the inorganic additive and the organic additive to purified water and stirring, and then adding the inorganic flocculant and the organic flocculant and stirring again to prepare a slurry, b) removing impurities from the slurry, and c) drying the resulting sheet.

The thickness of the ceramic sheet may be from 0.05 to 5 mm, but is not limited thereto. If the thickness of the ceramic sheet is smaller than 0.05 mm, it is difficult to make the ceramic sheet. And, if it exceeds 5 mm, binding between the ceramic sheet and the polymer matrix may be insufficient.

The ceramic sheet may be provided on one or both sides of the biocomposite.

Figure 4:
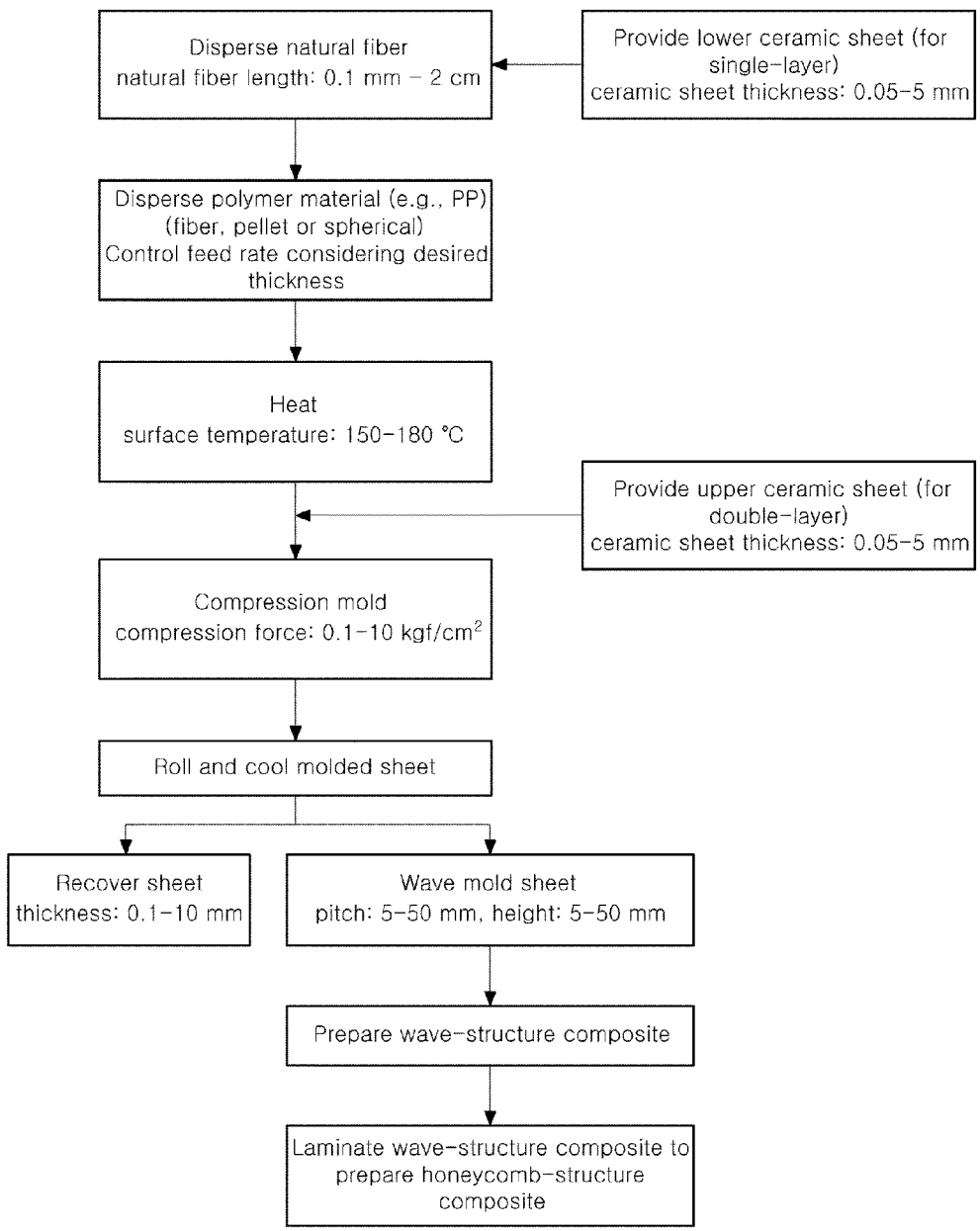
FIG. 4 shows a flow diagram of a process for preparing a biocomposite according to an embodiment of the present disclosure.

Hereinafter, a method for preparing a biocomposite according to the present disclosure will be described in detail. FIG. 4 shows a flow diagram of a process for preparing a biocomposite according to an embodiment of the present disclosure.

Specifically, the method for preparing a biocomposite according to the present disclosure comprises: 1) dispersing cut natural fiber and polymer powder on a ceramic sheet; 2) heating the ceramic sheet with the natural fiber and the polymer powder dispersed to melt the polymer powder and then performing compression molding by heating; and 3) cooling the compression molded sheet.

The compression molding of the step 2) may be performed using, for example, a compression molding roller. A compression force of the compression molding roller may be 0.1 kgf/cm² or more, more specifically 0.1 to 10 kgf/cm² or more. If the compression force is less than 0.1 kgf/cm², binding between the natural fiber and the polymer matrix may be weak and smoothness of the biocomposite may be greatly degraded. And, if it exceeds 10 kgf/cm², the melt polymer may be squeezed out and, thus, it may be difficult to prepare the biocomposite with wanted thickness. When the compression molding is performed using a plurality of compression molding rollers, a more compact and smooth sheet may be obtained.

After the step 2), the composite is cooled to obtain the biocomposite.

After the step 3), the resulting biocomposite may be heated again to melt the polymer, and, after placing another ceramic sheet thereon, compression molding may be performed by heating to prepare an eco-friendly incombustible biocomposite with the ceramic sheets attached on both sides.

Also, in accordance with the present disclosure, an eco-friendly incombustible biocomposite with the ceramic sheet provided therein may be prepare by: 1) dispersing cut natural fiber and polymer powder on a ceramic sheet laminated integrally a polymer matrix comprising a natural fiber; 2) heating the ceramic sheet with the natural fiber and the polymer powder dispersed to melt the polymer powder and then performing compression molding by heating; and 3) cooling the compression molded sheet.

Since the ceramic sheet, the natural fiber, the polymer matrix, or the like are the same as described above, detailed description will be omitted.

Figure 2A:
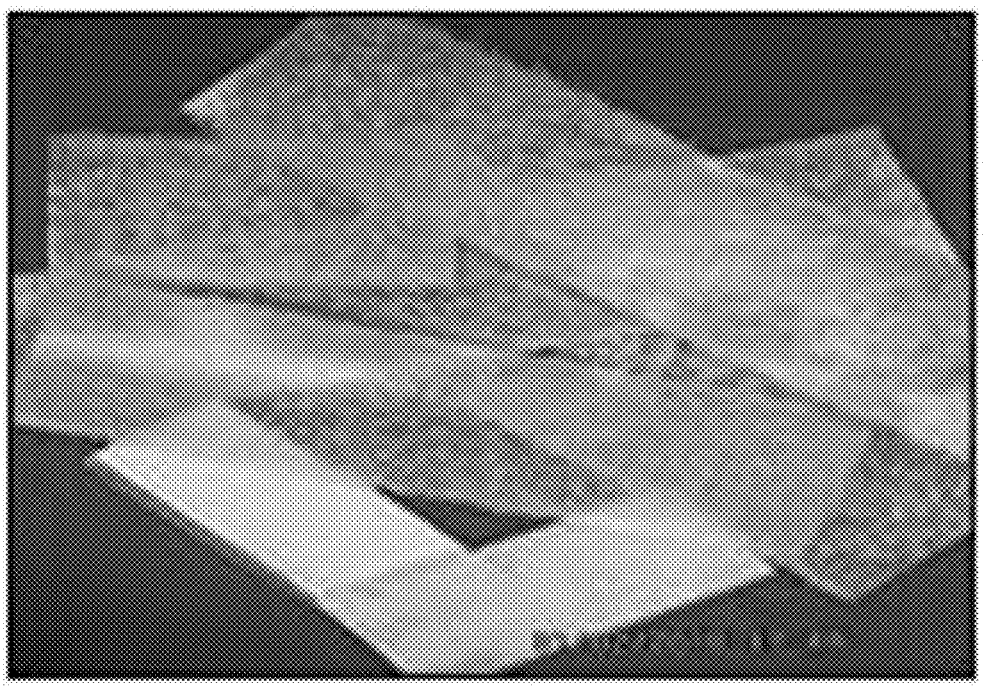
FIG. 2a shows an image of biocomposite having a plate structure.

The biocomposite according to the present disclosure may be prepared into various shapes and structures. For example, the biocomposite according to the present disclosure may be prepared into a plate structure, a wave structure, a plate-wave combination structure, a honeycomb structure, or a multi-layer structure thereof. Various types of the biocomposite according to the present disclosure are shown in FIG. 1 and FIG. 2.

Among them, a wave-structure biocomposite may be prepared as follows. The plate-structure sheet prepared as described above may be prepared into a wave-structure composite through a wave rolling process with the surface temperature of the plate-structure sheet maintained at 50 to 150° C. This may be achieved continuously after the preparation of the biocomposite sheet by equipping a wave molding roller.

Further, a combination-structure biocomposite may be prepared by applying an adhesive on crest portions of at least one side of the wave-structure sheet and then laminating a plate-structure biocomposite on one or both sides. The resulting combination-structure biocomposite has better strength than two sheets of simply laminated plate-structure biocomposite.

The biocomposite according to the present disclosure may also be prepared into a honeycomb structure by laminating at least two combination-structure biocomposites. The honeycomb-structure biocomposite has very superior properties including tensile strength and may be used for packaging or building materials.

EXAMPLES

The examples and experiments will now be described. The following examples and experiments are for illustrative purposes only and not intended to limit the scope of this disclosure.

Example 1

Preparation of Ceramic Sheet 100 parts by weight of a ceramic fiber was put in a slurry tank, and 20,000 parts by weight of purified water and 20 parts by weight of an organic additive, based on 100 parts by weight of the ceramic fiber, were added to the slurry tank. Then, 20 parts by weight of an organic fiber, based on 100 parts by weight of the ceramic fiber, was added to the slurry tank. Thereafter, 25 parts by weight of an inorganic additive, based on 100 parts by weight of the ceramic fiber, was added to the slurry tank. Subsequently, the mixture was stirred at 1,500 rpm for 2 hours, so that the additives could be sufficiently dispersed in the slurry tank.

The ceramic fiber was aluminosilicate fiber ($Al_2O_3$—$SiO_2$), the organic fiber was cellulose fiber, the inorganic additive was sepiolite, a fibrous natural mineral, and the organic additive was polyethylene glycol.

After the stirring, 1.85 parts by weight of an inorganic flocculant and 1.85 parts by weight of an organic flocculant, based on 100 parts by weight of the ceramic fiber, were added to the slurry tank so that the fine particles of the additives might not pass through a wire mesh, thus preparing a slurry. Then, the slurry was stirred again at 300 rpm for 30 minutes so that the flocculated additives might not be suspended.

The inorganic flocculant was aluminum sulfate, and the organic flocculant was poly(diallyldimethylammonium chloride) (PDADMAC).

After the second stirring, the slurry was transferred to a specific gravity separator using a metering pump in order to remove impurities having larger specific gravity than the additives, i.e. the ceramic fiber, organic fiber, inorganic additive, organic additive, inorganic flocculant and organic flocculant, and then fed to a sheet making apparatus.

After removing the impurities using the specific gravity separator, the slurry was fed uniformly to a wire mesh of the sheet making apparatus and prepared into a ceramic sheet with a water content of 82% through spontaneous dehydration and suction dehydration. The ceramic sheet was compression dehydrated by passing through a 4-stage compression roller with a compression force of 6 kgf/cm², thereby obtaining a ceramic sheet with a water content of 63%. Then, the resulting ceramic sheet was passed through a drying roller with the surface temperature maintained at 150° C., thus preparing a ceramic sheet with a water content of 12%.

Example 2

Preparation of Biocomposite with Ceramic Sheet Attached on One Side

Alight, eco-friendly biocomposite was prepared using a natural fiber, i.e. henequen fiber, kenaf fiber or silk fiber, as a reinforcement material. Polypropylene (PP, Hanwha Polydreamer), a general-use polymer, was used as a polymer matrix. A spherical PP with a diameter from 0.1 to 1 mm was used so that the polymer could be dispersed well.

After feeding the natural fiber (henequen, kenaf or silk) cut to 5 to 10 mm to the ceramic sheet prepared in Example 1 using a vibrating feeder, the spherical PP powder was uniformly dispersed on the natural fiber.

Then, after heating to 150 to 180° C. so that the spherical PP powder was completely melt, a biocomposite with the ceramic sheet attached was prepared by compression molding using a compression molding roller with a compression force of 0.2 kgf/cm² and then cooling to room temperature using an air cooling apparatus.

Example 3

Preparation of Biocomposite with Ceramic Sheets Attached on Both Sides

A biocomposite with the ceramic sheets attached on both sides was prepared in the same manner as Example 2, except that, after heating to melt PP, another ceramic sheet was further provided thereon.

FIG. 1 shows images of the biocomposites, using henequen fiber, kenaf fiber and silk fiber from above. The images on the left side show the biocomposites without a ceramic sheet, those in the middle show the biocomposites having a ceramic sheet on one side, and those in the right side show the biocomposites having ceramic sheets on both sides.

Example 4

Preparation of Biocomposite Having Wave Structure

Figure 2B:
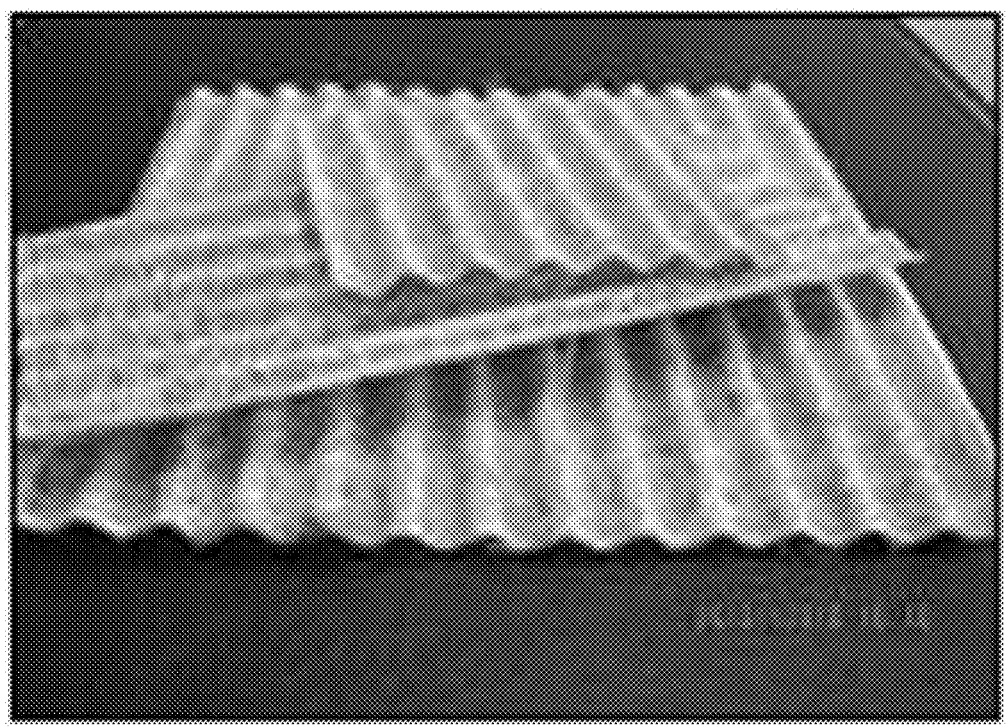
FIG. 2b shows an image of biocomposite having a wave structure.

A wave-structure sheet was prepared from the biocomposite having the ceramic sheet prepared in Example 2 or Example 3 using a wave roller, with the surface temperature maintained at 50 to 150° C. (FIG. 2b). Also, a plate-wave combination sheet was prepared by applying an adhesive on crest portions of the wave-structure sheet prepared above and then further attaching the plate-structure biocomposite prepared in Example 2 or 3 (FIG. 2c and FIG. 3(c) and (d)).

Example 5

Preparation of Biocomposite Having Honeycomb Structure

Figure 2C:
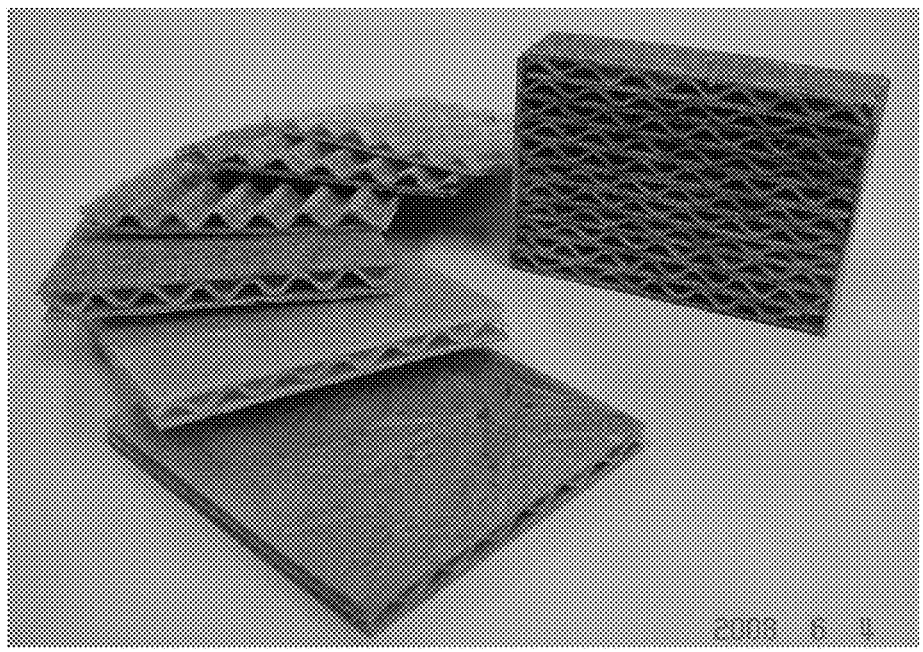
FIG. 2c shows an image of biocomposite having a combined honeycomb structure.
Figure 3:
FIG. 3 shows cross-sectional views of biocomposites, having a plate structure, a wave structure, a combination structure and a honeycomb structure.
Figure 3:
Figure 3:
Figure 3:
Figure 3:
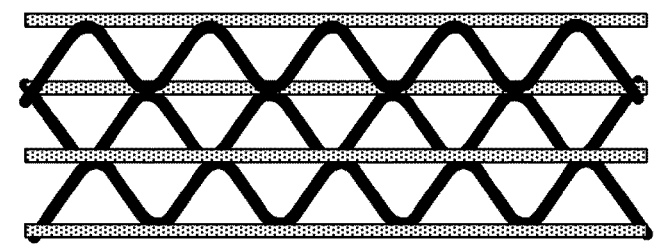

A honeycomb-structure biocomposite was prepared by laminating a plurality of the plate-wave combination biocomposites prepared in Example 4 (FIG. 2c and FIG. 3(e)). The honeycomb-structure biocomposite may be used for automotive or building materials because it has superior strength and impact absorbing ability.

Test Example 1

Physical Properties of Biocomposite

A. Physical Property Measurement

The physical properties of the biocomposites were investigated through flexural test, Izod impact test, dynamic mechanical analysis and thermomechanical analysis.

(1) Flexural Test

A universal testing machine (UTM, Tinius Olsen Ltd., H-50K-S T, Redhill, England) was used to measure flexural properties of the biocomposite. Three point bending flexural test was carried out according to the ASTM D 790 Method I (three-point loading) at room temperature (23±2° C.) and 50±5% relative humidity. A specimen was 50 mm×25 mm×2 mm in size. The span-to-depth ratio of the specimen was 16, a load was 50 kN, and a cross head speed was set at 1 mm/min.

(2) Dynamic Mechanical Analysis

A dynamic mechanical analyzer (DMA Q-800, TA Instrument) was used to measure storage modulus and tan δ. The specimen for analysis was 35.0 mm×11.0 mm×1.7 mm in size. Measurement was made at from 30 to 150° C. for a BRAF (bleached red algae fiber)/PLA (polylactic acid) biocomposite, and in a liquid nitrogen atmosphere of from −100° C. to −30° C. for a BRAF/PP/nanoclay biocomposite. Heating rate was set at 5° C./min so that the composite specimen might fully reach thermal equilibrium in the heating furnace. Measurement was made in a single cantilever mode, with sinusoidally oscillating frequency. The frequency was fixed at 1 Hz and the oscillating amplitude was maintained at 0.2 mm.

(3) Thermomechanical Analysis

A thermomechanical analyzer (TMA Q-400, TA Instrument) was used to analyze the thermal expansion behavior of the biocomposite along the thickness direction. The measured value was converted into the coefficient of thermal expansion (CTE). The specimen was 7.0 mm×7.0 mm×1.7 mm in size and had been kept in a desiccator for over 24 hours before measurement. Heating was performed up to 100° C. at a rate of 5° C./min. A probe for measuring the degree of expansion of the specimen was kept under a nitrogen atmosphere at 100 mL/min.

B. Result

Density, storage modulus, dimensional stability and flexural modulus of the biocomposites with respect to the presence or absence of the ceramic sheet will be described referring to FIGS. 5-9. In FIGS. 5 to 9, PP stands for polypropylene, HQ for henequen fiber, KE for kenaf fiber, SK for silk, and BRAF for bleached red algae fiber.

Figure 5:
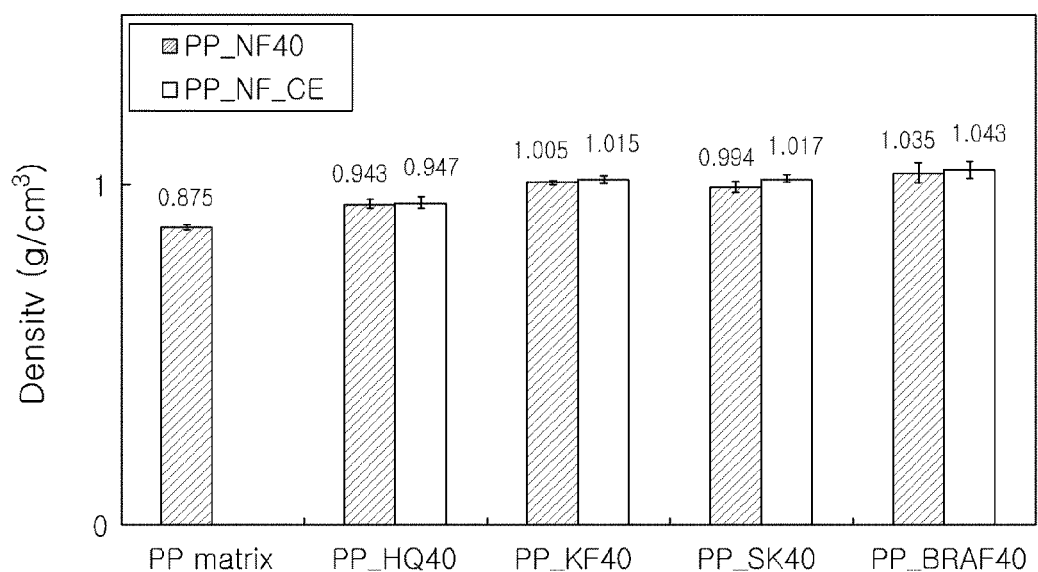
FIG. 5 compares density of biocomposites depending on the kind of natural fiber and the presence or absence of ceramic sheet.

FIG. 5 shows the change in density of the biocomposites depending on the presence or absence of ceramic sheet. The use of the ceramic sheet did not resulted in significant increase of the biocomposites. Thus, the eco-friendly biocomposite according to the disclosure may replace the glass fiber-reinforced polymer composite, while maintaining lightweightness.

Figure 6:
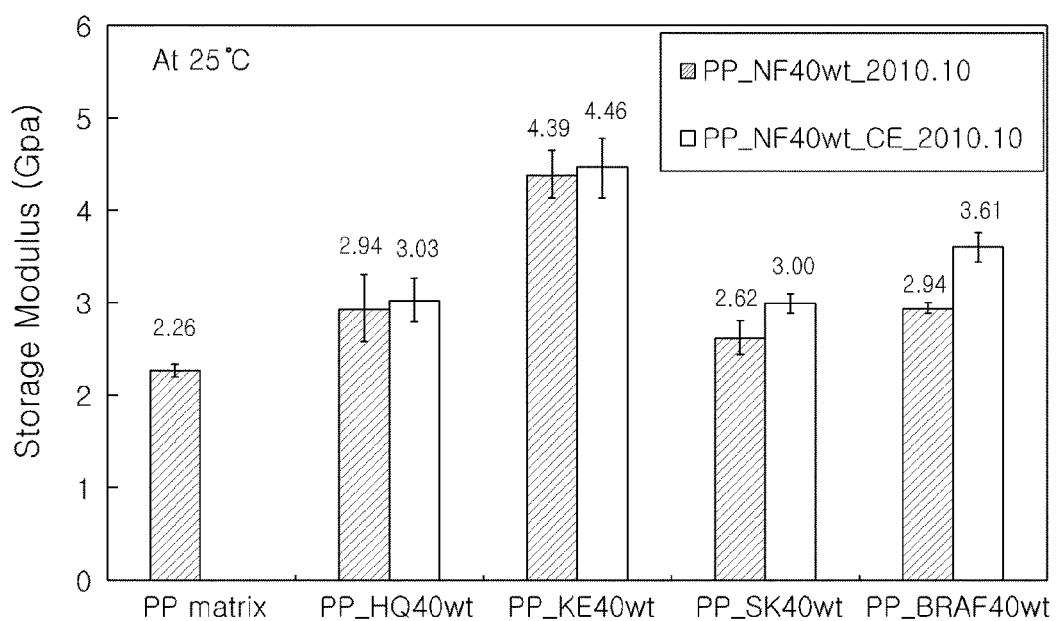
FIG. 6 compares storage modulus of biocomposites depending on the kind of natural fiber and the presence or absence of ceramic sheet.

FIG. 6 shows change in storage modulus of the biocomposites depending on the presence or absence of ceramic sheet. The biocomposites having the ceramic sheet show comparable or increased storage modulus when compared to the ceramic sheet-free biocomposites. This suggests that the ceramic sheet, the polymer and the natural fiber were hybridized well.

Figure 7:
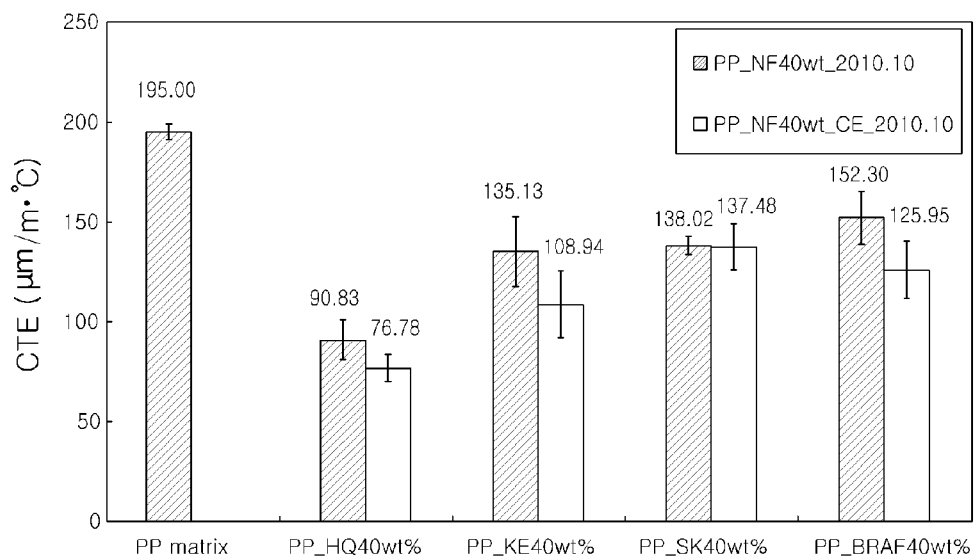
FIG. 7 compares dimensional stability (coefficient of thermal expansion; CTE) of biocomposites depending on the kind of natural fiber and the presence or absence of ceramic sheet.

FIG. 7 shows change in dimensional stability of the biocomposites depending on the presence or absence of ceramic sheet. The biocomposites having the ceramic sheet show decreased coefficients of thermal expansion as compared to the ceramic sheet-free biocomposites. This suggests that the dimensional stability of the biocomposites with temperature was improved through hybridization with the ceramic sheet.

Figure 8:
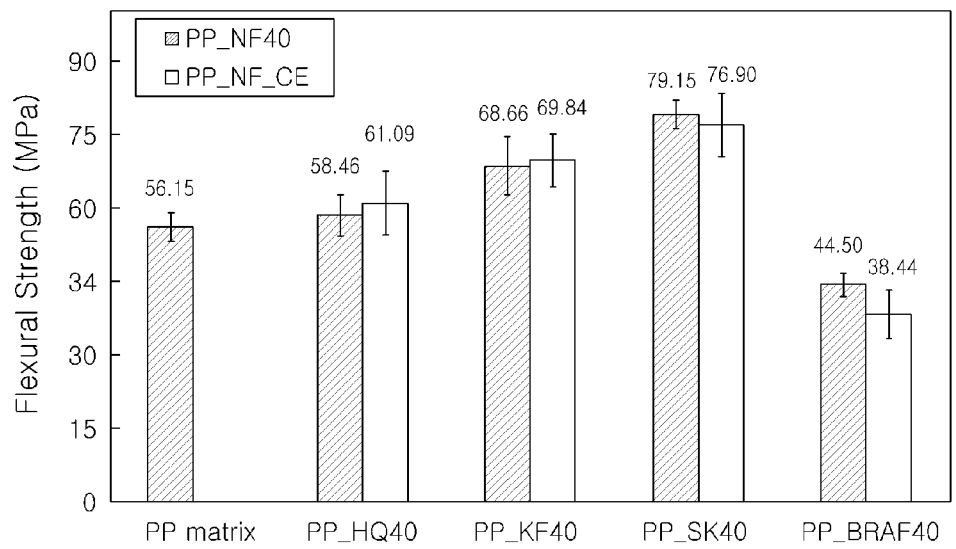
FIG. 8 compares flexural strength of biocomposites depending on the kind of natural fiber and the presence or absence of ceramic sheet.
Figure 9:
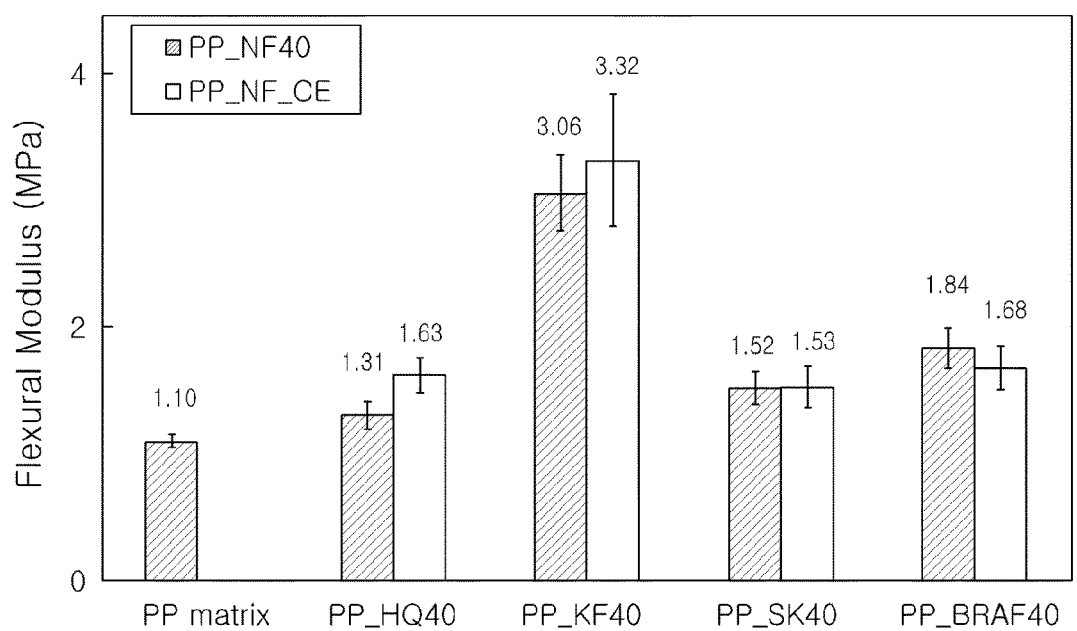
FIG. 9 compares flexural modulus of biocomposites depending on the kind of natural fiber and the presence or absence of ceramic sheet.

FIG. 8 shows change in flexural strength and FIG. 9 shows change in flexural modulus of the biocomposites depending on the presence or absence of ceramic sheet. The biocomposites having the ceramic sheet show comparable or increased flexural strength and modulus as compared to the ceramic sheet-free biocomposites. This suggests that the ceramic sheet, the polymer and the natural fiber which were hybridized well resulted in a complementary effect.

Test Example 2

Flame Retardancy of Biocomposite

Flame retardancy of biocomposites was analyzed. Flame retardancy was analyzed for a ceramic sheet-free biocomposite, a biocomposite with a ceramic sheet attached on one side (Example 2) and a biocomposite with ceramic sheets attached on both sides (Example 3) by measuring the burning speed under the same conditions. The test was carried out for five specimens per each, and the result was given as average values.

Figure 10:
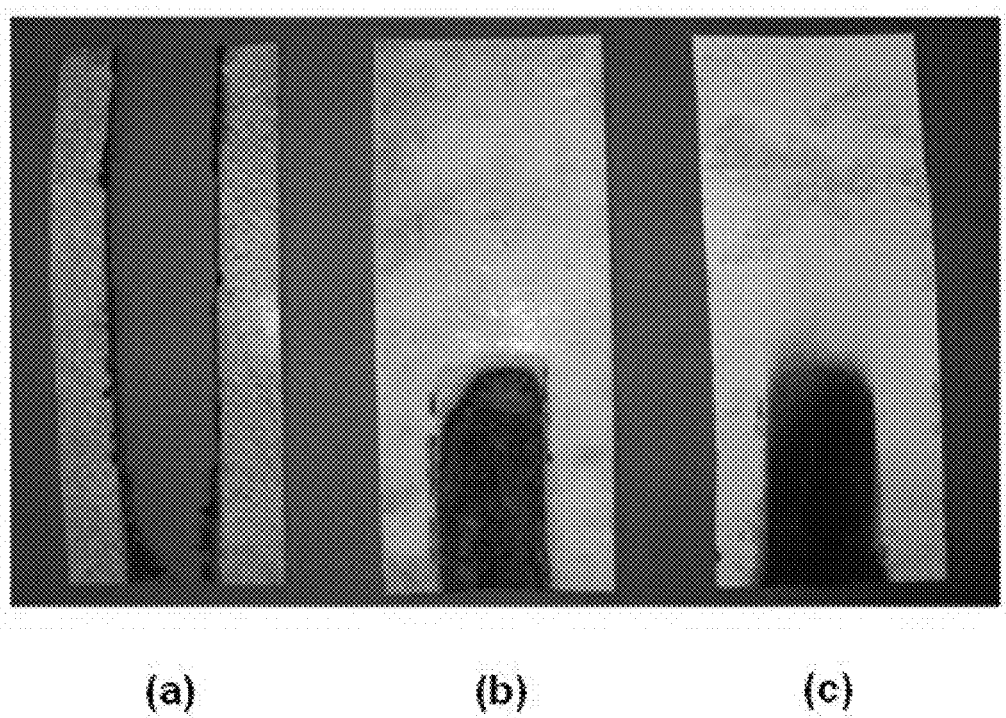
FIG. 10 shows flame retardancy of biocomposites (using henequen fiber as a reinforcement material) [(a) shows a biocomposite comprising a natural fiber and a polymer matrix only, (b) shows a biocomposite having a ceramic sheet on one side, and (c) shows a biocomposite having ceramic sheets on both sides.]

FIG. 10 shows flame retardancy of the biocomposites using henequen fiber as a reinforcement material. (a) shows a biocomposite comprising a natural fiber and a polymer matrix only, (b) shows a biocomposite having a ceramic sheet on one side, and (c) shows a biocomposite having ceramic sheets on both sides.

Figure 11:
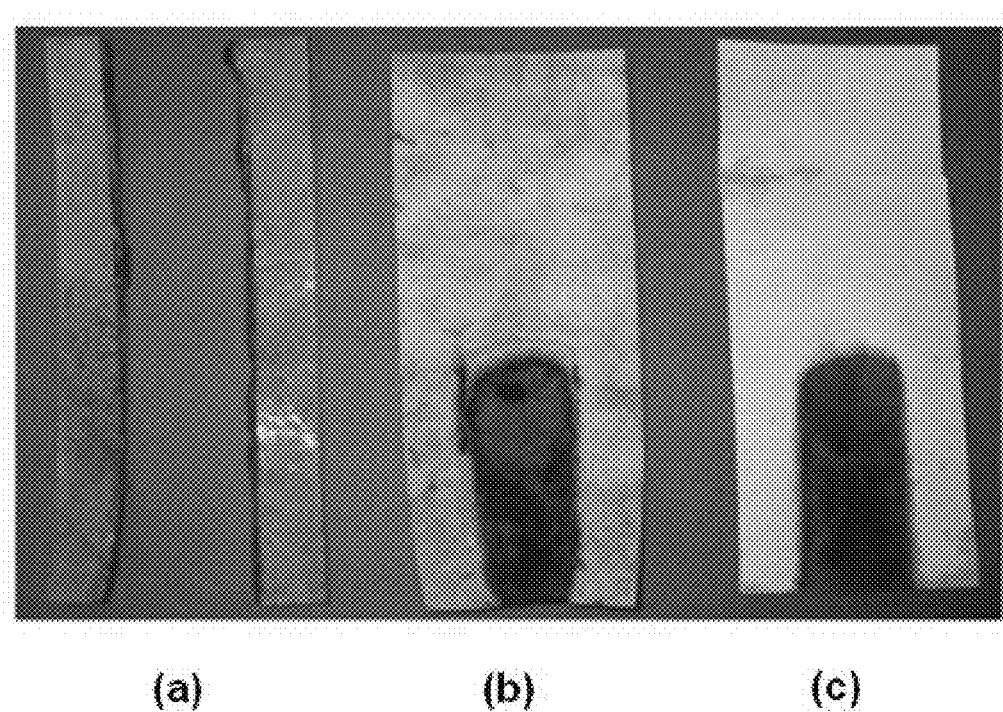
FIG. 11 shows flame retardancy of biocomposites (using kenaf fiber as a reinforcement material) [(a) shows a biocomposite comprising a natural fiber and a polymer matrix only, (b) shows a biocomposite having a ceramic sheet on one side, and (c) shows a biocomposite having ceramic sheets on both sides.]

FIG. 11 shows flame retardancy of the biocomposites using kenaf fiber as a reinforcement material. (a) shows a biocomposite comprising a natural fiber and a polymer matrix only, (b) shows a biocomposite having a ceramic sheet on one side, and (c) shows a biocomposite having ceramic sheets on both sides.

As seen from the figures, the ceramic sheet-free biocomposites burnt easily, whereas the biocomposites having the ceramic sheet maintained their sheet structure.

Figure 12:
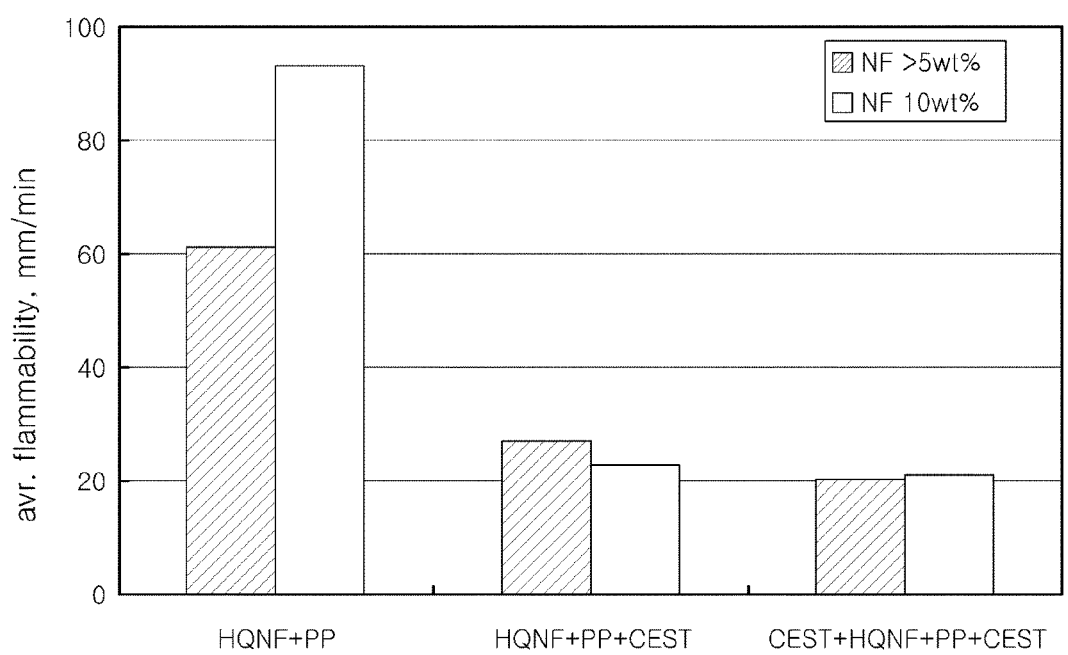
FIG. 12 shows a result of measuring average flammability of biocomposite comprising henequen fiber (5 wt % or less or 10 wt %.) as a natural fiber, depending on the absence or presence of ceramic sheet on one or both sides.

FIG. 12 shows a result of measuring the average flammability of the biocomposites, depending on the absence or presence of ceramic sheet. In the figure, HQNF+PP stands for the henequen natural fiber-reinforced polypropylene biocomposite with no ceramic sheet, HQNF+PP+CEST stands for the henequen natural fiber-reinforced polypropylene biocomposite having the ceramic sheet on one side, and CEST+HQNF+PP+CEST stands for the henequen natural fiber-reinforced polypropylene biocomposite having the ceramic sheets on both sides. The natural fiber content was 5 wt % or less or 10 wt %.

As seen from the figure, the biocomposites having the ceramic sheet showed much lower burning rate than the ceramic sheet-free biocomposites. When the natural fiber content was 10 wt %, the flame retardancy was outstanding even when the ceramic sheet was attached only on one side.

Figure 13:
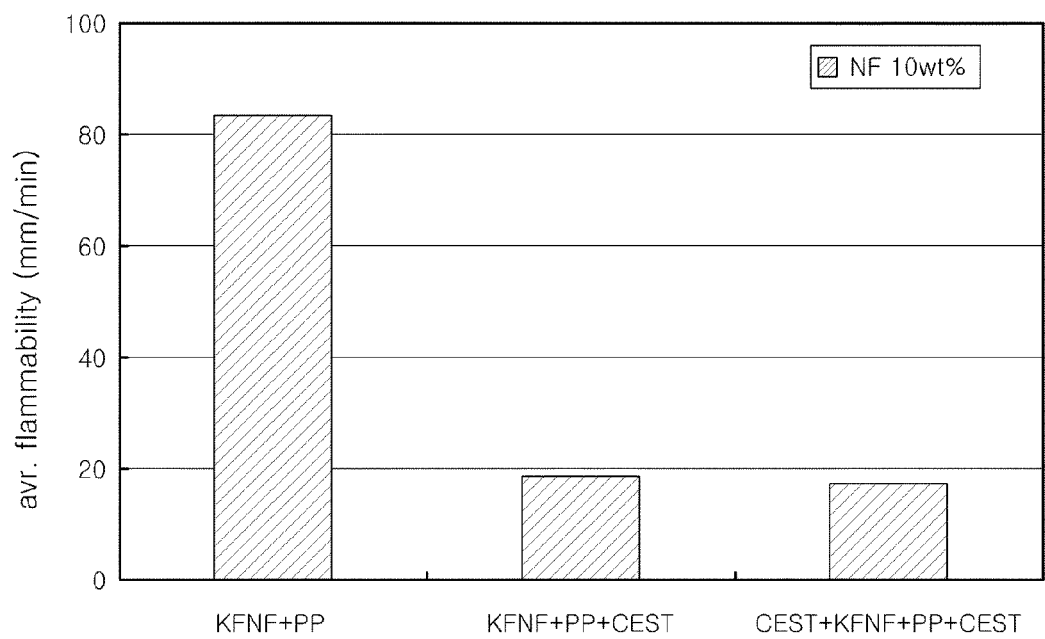
FIG. 13 shows a result of measuring average flammability of biocomposite comprising kenaf fiber (10%) as a natural fiber, depending on the absence or presence of ceramic sheet on one or both sides.

FIG. 13 shows a result of measuring the average flammability of the biocomposites comprising kenaf fiber (10%) as a natural fiber. In the figure, KENF+PP stands for the kenaf natural fiber-reinforced polypropylene biocomposite with no ceramic sheet, KENF+PP+CEST stands for the kenaf natural fiber-reinforced polypropylene biocomposite having the ceramic sheet on one side, and CEST+KENF+PP+CEST stands for the kenaf natural fiber-reinforced polypropylene biocomposite having the ceramic sheets on both sides. Similar to the henequen case, the biocomposites having the ceramic sheet showed much lower burning rate than the ceramic sheet-free biocomposite.

The biocomposite using a natural fiber as a reinforcement material according to the present disclosure is eco-friendly and light. Further, as a result of integrally laminating with a ceramic sheet, the biocomposite is incombustible. In particular, the biocomposite according to the present disclosure shows improved storage modulus, dimensional stability and flexural properties.

In addition, the biocomposite according to the present disclosure may be easily processed into various shapes, including a wave structure or a honeycomb structure. With improved impact absorbing ability, such a biocomposite having the 3D structure may be useful for automotive or building indoor/outdoor materials.

While the present disclosure has been described with respect to the specific embodiments, it will be apparent to those skilled in the art that various changes and modifications may be made without departing from the spirit and scope of the disclosure as defined in the following claims.

What is claimed is:

1. An eco-friendly incombustible biocomposite comprising:
    a polymer matrix comprising a polymer and a natural fiber; and
    a ceramic sheet laminated integrally with the polymer matrix, the ceramic sheet being provided on both sides of the polymer matrix and each having a thickness of from 0.05 to 5 mm,
    wherein the content of the natural fiber is 1 to 70 wt %, the content of the polymer is 1 to 98 wt %, and the content of the ceramic sheet is 1 to 30 wt %, based on the total weight of the biocomposite, and
    wherein the ceramic sheet comprises a ceramic fiber in a content of 50 wt % or more based on the total weight of the ceramic sheet, the ceramic fiber being formed of $SiO_2$, $Al_2O_3$, CaO, MgO or a mixture thereof.

2. The eco-friendly incombustible biocomposite according to claim 1, wherein the natural fiber is one or more selected from a group consisting of wood pulp, non-wood fiber, microalgae byproduct, seaweed byproduct, silk fiber and henequen fiber.

3. The eco-friendly incombustible biocomposite according to claim 2, wherein the wood pulp or the non-wood fiber is 1 μm to 3 cm in length.

4. The eco-friendly incombustible biocomposite according to claim 2, wherein the microalgae byproduct or the seaweed byproduct is 0.1 to 1,000 μm in length.

5. The eco-friendly incombustible biocomposite according to claim 1, wherein the polymer is a biodegradable polymer, which is one or more selected from a group consisting of polylactic acid (PLA), polycaprolactone (PCL), blend of polylactic acid (PLA) with starch and polybutylene succinate (PBS), polypropylene, polyethylene and polycarbonate, and a blend thereof.

6. The eco-friendly incombustible biocomposite according to claim 1, wherein the ceramic sheet further comprises one or more additives selected from the group consisting of an organic fiber, an inorganic additive, an organic additive, an inorganic flocculant and an organic flocculant.

7. The eco-friendly incombustible biocomposite according to claim 1, wherein the biocomposite has a thickness of 0.1 mm to 10 cm.

8. The eco-friendly incombustible biocomposite according to claim 1, which has a plate structure, a wave structure, a plate-wave combination structure, a honeycomb structure, or a multilayer structure thereof.

* * * * *